United States Patent
Dhesikan et al.

(10) Patent No.: US 8,000,347 B2
(45) Date of Patent: Aug. 16, 2011

(54) EXECUTING AND SUPPORTING A MULTIPLE BANDWIDTH RESERVATION REQUEST

(75) Inventors: Subhasri Dhesikan, San Jose, CA (US); James M. Polk, Colleyville, TX (US)

(73) Assignee: Cisco Technology, Inc., San Jose, CA (US)

( * ) Notice: Subject to any disclaimer, the term of this patent is extended or adjusted under 35 U.S.C. 154(b) by 372 days.

(21) Appl. No.: 12/262,498

(22) Filed: Oct. 31, 2008

(65) Prior Publication Data

US 2010/0111103 A1 May 6, 2010

(51) Int. Cl.
*H04J 3/16* (2006.01)
(52) U.S. Cl. .................................. 370/468; 370/395.41
(58) Field of Classification Search ............. 370/395.41, 370/468
See application file for complete search history.

(56) References Cited

U.S. PATENT DOCUMENTS

| | | | | |
|---|---|---|---|---|
| 6,128,292 A * | 10/2000 | Kim et al. | ...................... | 370/356 |
| 7,720,947 B2 * | 5/2010 | Kanemaki et al. | ............. | 709/223 |
| 7,796,608 B2 * | 9/2010 | Rawlins et al. | ............. | 370/395.4 |
| 7,801,036 B2 * | 9/2010 | Goode | ........................... | 370/230 |

FOREIGN PATENT DOCUMENTS

WO    2008/008886 A1    1/2008

OTHER PUBLICATIONS

Bos, L. et al.; "A Framework for End-to-End User Perceived Quality of Service Negotiation";MMUSIC Working Group, Internet Draft, draft-bos-mmusic-sdpqos-framework-00.txt, http://www.ietf.org/ietf/lid-abstracts.txt; Nov. 2001; pp. 1-22; XP015011049 ISSN: 0000-0004.
Polk, J. et al.; "A Resource Reservation Protocol (RSVP) Extension for the Reduction of Bandwidth of a Reservation Flow"; Network Working Group, Request for Comments (RFC) 4495, http://tools.ietf.org/pdf/rfc4495.pdf May 2006; pp. 1-21.

* cited by examiner

*Primary Examiner* — Phuc Tran
(74) *Attorney, Agent, or Firm* — P. Su

(57) ABSTRACT

In one embodiment, a method includes obtaining a first message that includes at least a first bandwidth request that specifies a first bandwidth and a second bandwidth request that specifies a second bandwidth. The first bandwidth is a preferential bandwidth. The method also includes determining whether the first bandwidth may be allocated, and storing the first bandwidth and the second bandwidth in a stored reservation state if the first bandwidth may be allocated. If the first bandwidth may not be allocated, the method includes determining whether the second bandwidth may be allocated. The second bandwidth in the stored reservation state if it is determined that the second bandwidth may be allocated. In one embodiment, if the second bandwidth may be allocated, the first bandwidth is removed during process prior to sending the message to a subsequent node upstream.

26 Claims, 10 Drawing Sheets

EXECUTING AND SUPPORTING A MULTIPLE BANDWIDTH RESERVATION REQUEST

BACKGROUND OF THE INVENTION

The present invention relates generally to communications systems.

The Resource Reservation Protocol (RSVP) is a transport layer protocol which allows resources to be reserved across a network. The resources are generally reserved for a flow. Typically, a sender of a request will send an RSVP, or Path, message downstream to a receiver. The receiver will send an RSVP reservation request (RESV) message upstream to a sender of the request in response to the Path message. Some hops in a path between the receiver and the sender is arranged to create and maintain a reservation state that is associated with the resources reserved for data packets which are to be sent from the sender.

Typically, a RESV message specifies a bandwidth request which effectively indicates the amount of resources to be reserved for a flow. Each hop in a path that receives the RESV message ascertains whether it has sufficient resources to accommodate the bandwidth request. If a hop is able to accommodate the bandwidth request, the hop effectively reserves the appropriate amount of bandwidth for the flow. If the hop is unable to accommodate the bandwidth request, the hop generates an RSVP reservation error (RESVERR) message and sends the RESVERR message to the endpoint that is the source of the RESV message.

When an endpoint that is the source of the RESV message receives the RESVERR message, the endpoint may send a new RESV message which specifies a request for a smaller amount of bandwidth. As will be appreciated by those skilled in the art, some applications are only able to use certain bandwidths which match with the codecs supported by the applications. Hence, a request for a smaller amount of bandwith is generally a request for a smaller amount of bandwidth which matches the appropriate codes. In general, multiple RESV messages may be sent by an endpoint in an effort to reserve resources for a flow. By way of example, if a RESV message that requests eighty kilobytes per second (kbps) may not be accommodated, a subsequent RESV message that requests forty kbps may be sent. If the RESV message that request forty kbps also may not be accommodated, a subsequent RESV message that requests twenty kbps may be sent, and so forth. Typically, the amount of bandwidth within a RESV message substantially matches the amount of bandwidth within a chosen audio or video codec for a voice or video call, for example. An endpoint may support more than one codec, and may want to reserve the amount of bandwidth its preferred codec requires to operate within.

The sending and processing of multiple RESV messages may be relatively time consuming. As a result, it may sometimes not be possible for resources to be reserved for a flow in an efficient manner.

BRIEF DESCRIPTION OF THE DRAWINGS

The invention will be readily understood by the following detailed description in conjunction with the accompanying drawings in which.

DESCRIPTION OF EXAMPLE EMBODIMENTS

General Overview

Figure 1A:
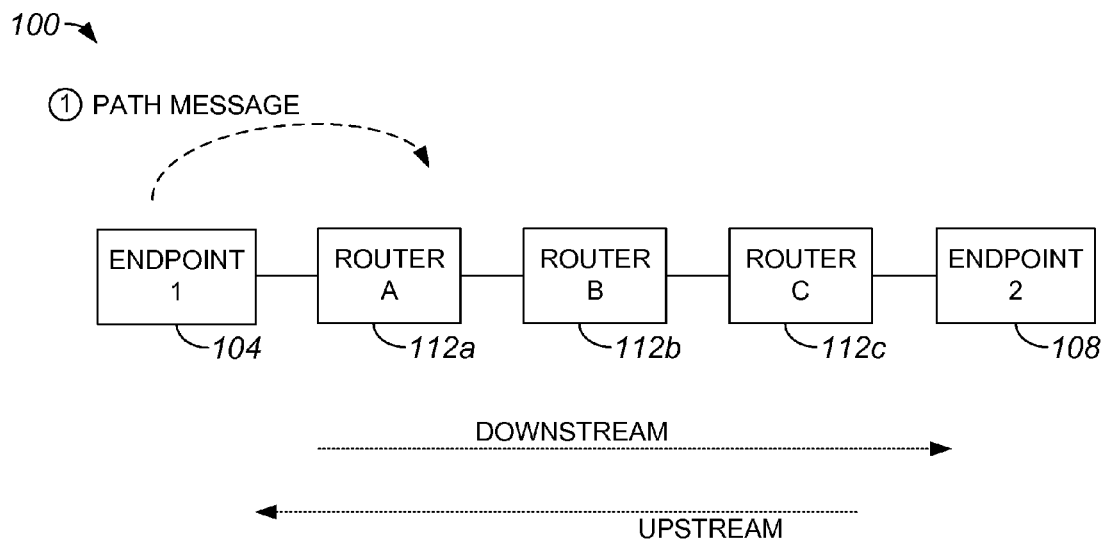
FIG. 1A is a block diagram representation of one system which may support Resource Reservation Protocol (RSVP) reservation (RESV) messages that specify multiple bandwidths at a time t1 in which a PATH message is sent by an endpoint in accordance with an embodiment of the present invention.

According to one aspect of the present invention, a method includes obtaining a first message that includes at least a first bandwidth request that specifies a first bandwidth and a second bandwidth request that specifies a second bandwidth. The first bandwidth is a preferential bandwidth. The method also includes determining whether the first bandwidth may be allocated, and storing the first bandwidth and the second bandwidth in a stored reservation state if the first bandwidth may be allocated. If the first bandwidth may not be allocated, the method includes determining whether the second bandwidth may be allocated. The second bandwidth in the stored reservation state if it is determined that the second bandwidth may be allocated.

DESCRIPTION

In some situations, multiple Resource Reservation Protocol (RSVP) reservation (RESV) request messages are sent along a path, or an accumulation of routers, between endpoints before a bandwidth allocation may be reserved with respect to that path for a desired flow. Sending multiple RESV requests messages may often be inefficient. By including multiple bandwidth requests within the same reservation request in a single RSVP message, a bandwidth allocation may be reserved relatively efficiently. If an RESV request message carries more than one bandwidth request, if a relatively high bandwidth request contained in the RESV request message may not be accommodated, it may be possible to accommodate a lower bandwidth request contained in the RESV request message. Hence, a lower than desired bandwidth may be allocated for a particular flow in response to a single RESV request message, i.e., the same RESV request message used to request a desired bandwidth.

Allowing RESV request messages to carry multiple traffic specification (TSPEC) objects enables a single RESV request message to effectively provide multiple acceptable bandwidths allocations for a desired flow. For example, a single RESV request message may specify first, second, and third bandwidth requests such that if a first bandwidth request may not be accommodated, the second bandwidth is considered and, if necessary, the third bandwidth is considered. It should be appreciated that more than three bandwidth requests may be specified. Further, when a single RESV request message contains more than one TSPEC object, a node along a path which receives the RESV request message may maintain more than one potential reservation state. Hence, if a first potential reservation state is associated with a bandwidth that may no longer be accommodated, the node may switch to a different reservation state, e.g., a reservation state associated with a lower bandwidth.

In one embodiment, an application within a requesting node or endpoint may effectively ask for a desired bandwidth allocation and at least one backup bandwidth allocation, e.g., a bandwidth allocation that would be acceptable in the absence of the desired bandwidth allocation. The desired bandwidth allocation and at least one backup bandwidth allocation may be provided in TSPEC objects contained in an RSVP request message such as an RESV request message. If the accumulation of routers that the RESV request message passes through, i.e., a network, is able to accommodate the desired bandwidth allocation, the desired bandwidth may be reserved. Otherwise, if a backup bandwidth allocation may be accommodated, the backup bandwidth allocation may be reserved.

Referring initially to FIG. 1A, one system which may support RSVP RESV request messages that specify multiple bandwidths will be described at a time t1 in accordance with an embodiment of the present invention. A system 100 includes an upstream endpoint host 104, a downstream endpoint host 108, and an accumulation of routers 112a-c or, more generally, intermediate hops or nodes. Endpoint 104 may be a server or a server application, and may be arranged to send a PATH message downstream to endpoint 108 via routers 112a-c at a time t1.

Figure 1B:
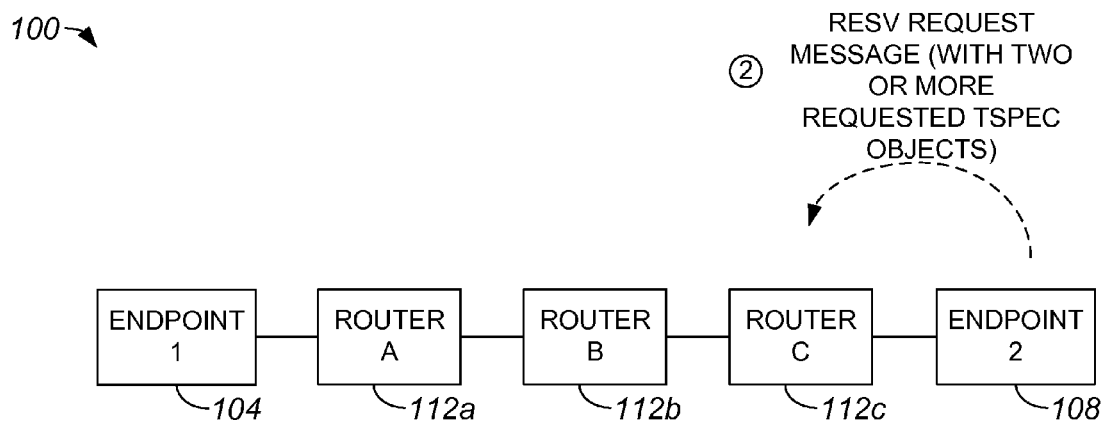
FIG. 1B is a block diagram representation of one system which may support RESV messages, e.g., system 100 of FIG. 1A, at a time t2 at which a RESV message that specifies multiple bandwidths is sent by an endpoint in accordance with an embodiment of the present invention.

Upon receiving a PATH message from endpoint 104, endpoint 108 may generate an RESV request message and send the RESV request message upstream through routers 112a-c at a time t2, as shown in FIG. 1B. The RESV request message may include two or more TSPEC objects which specify bandwidths that are requested by endpoint 108. TSPEC objects may be ordered within the RESV request such that the TSPEC object which specifies a preferred bandwidth is effectively ordered in a first position. That is, TSPEC objects associated with the RESV request message may be arranged in an order of preference with the preferential bandwidth being the highest bandwidth requested. In one embodiment, TSPEC objects may be arranged in an order of preference similar to how a session description protocol (SDP) identifies an order of preference associated with codecs in a media description line.

At least one router 112a-c includes functionality which enables multiple reservation states to be identified and stored. That is, one or more of routers 112a-c is configured to process an RESV request message that includes a plurality of TSPEC objects. For ease of discussion, each router 112a-c will be described as being arranged to process an RESV request message that includes a plurality of TSPEC objects. It should be appreciated, however, that network 100 may generally support the use of an RESV request message that includes a plurality of TSPEC objects as long as at least one router 112a-c is arranged to process such an RESV request message. Processing an RESV request message that includes a plurality of TSPEC objects on a router 112a-c may include, but is not limited to including, identifying a TSPEC object with the highest bandwidth that may be supported by the router 112a-c, storing the highest bandwidth that may be supported, and storing substantially all bandwidths identified in TSPEC objects that are lower than the highest bandwidth that may be supported. Such bandwidths may be stored on a routers 112a-c as reservation states.

Figure 1C:
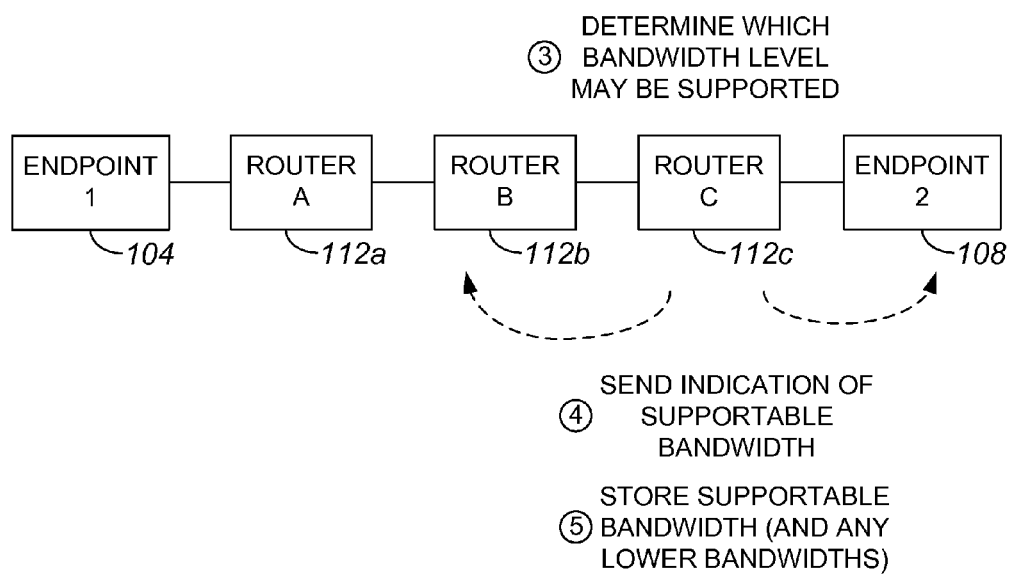
FIG. 1C is a block diagram representation of one system which may support RESV messages, e.g., system 100 of FIG. 1A, at a time t3 at which a RESV message that specifies multiple bandwidths is processed by a router in accordance with an embodiment of the present invention.

When endpoint 108 sends an RESV request message that includes a plurality of TSPEC objects upstream to endpoint 104, router 112c is the first hop in the overall path to endpoint 104. FIG. 1C shows system 100 at a time t3 at which a RESV request message that includes a plurality of TSPEC objects is processed by router 112c in accordance with an embodiment of the present invention. It should be appreciated that each router 112a-c may process the RESV request message if the RESV request message is to successfully reach endpoint 104. At a time t3, when router 112c receives an RESV request message that includes a plurality of TSPEC objects, e.g., specifies multiple requested bandwidths, router 112c determines which of the requested bandwidths it may support or otherwise accommodate.

Typically, router 112c identifies the highest bandwidth associated with the plurality of TSPEC objects that it may support. Then, router 112c sends an indication of a supportable bandwidth, i.e., the highest bandwidth associated with the plurality of TSPEC objects that router 112c is able to support. It should be appreciated that the highest bandwidth that router 112c is able to support may be lower than the preferential bandwidth specified by the TSPEC objects. If the supportable bandwidth is the preferential bandwidth, or the highest bandwidth requested, then router 112c propagates the RESV request message to the next hop, or router 112b. If the supportable bandwidth is not the preferential bandwidth, a modified RESV request message which provides an indication of the supportable bandwidth is propagated upstream to router 112b in a modified RESV request message, while a message such as an RSVP reservation error (RESVERR) message which provides an indication of the supportable bandwidth is propagated downstream to endpoint 108. In one embodiment, a modified RESV request message that is propagated upstream by router 112c may be modified such that TSPEC objects corresponding to bandwidths which are higher than the supportable bandwidth are effectively removed. Generally, if no bandwidth is supportable, e.g., if router 112c has no available bandwidth to allocate or to reserve, router 112c may send an appropriate indication downstream and/or upstream.

A supportable bandwidth may be stored by router 112c as a reservation state. In addition to storing the supportable bandwidth, any bandwidths lower than the supportable bandwidth may also be stored by router 112a as a reservation state.

That is, router 112c may store the highest bandwidth indicated in the TSPEC objects of a RESV request that router 112c is capable of supporting, as well as any lower bandwidths indicated in the TSPEC objects.

Figure 2:
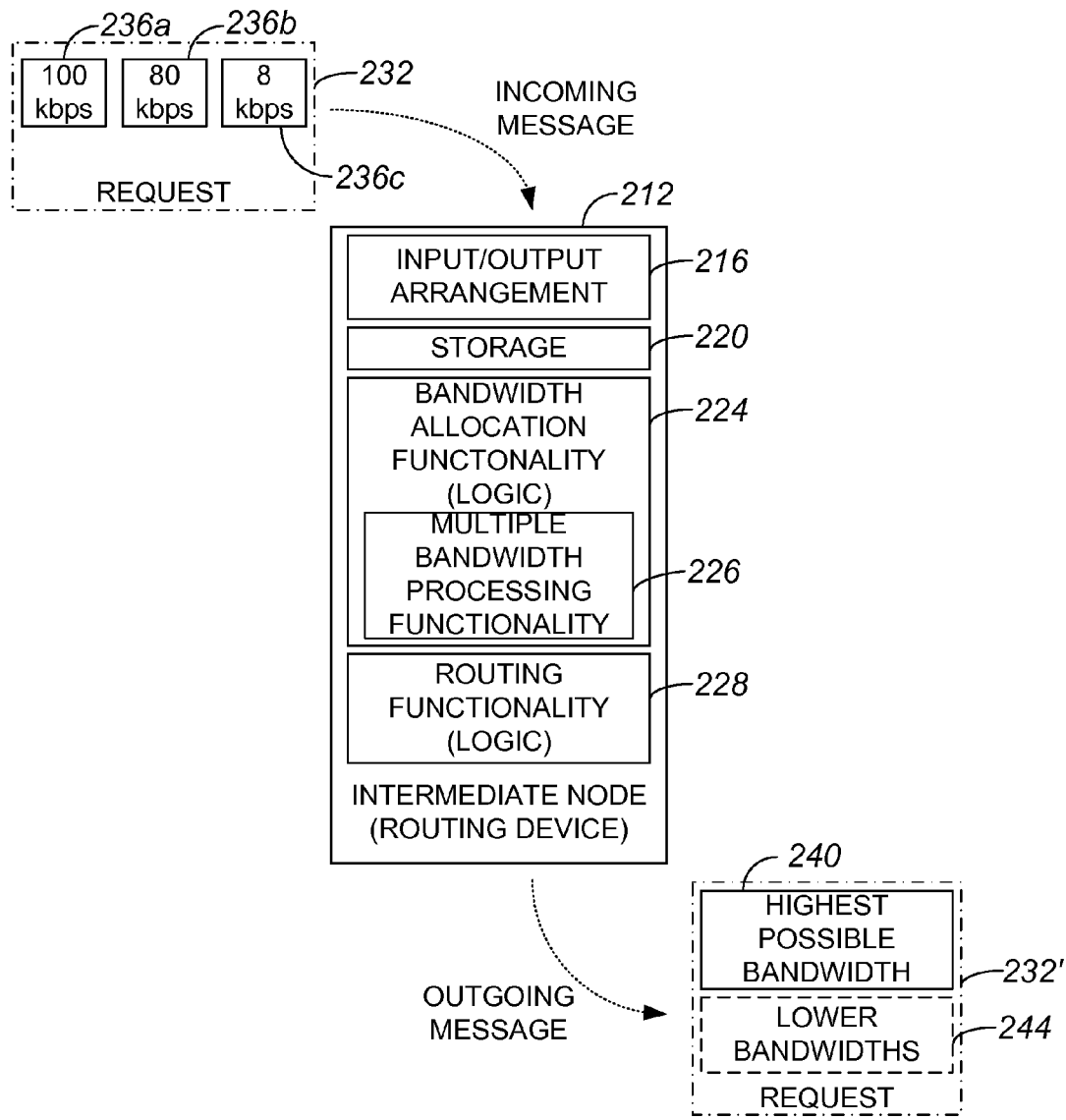
FIG. 2 is a diagrammatic representation of a device which is capable of processing an overall request that includes multiple bandwidth requests in accordance with an embodiment of the present invention.

As previously mentioned, at least one of routers 112a-c has the capability to process an overall request which includes more than one bandwidth request, e.g., a RESV request message which is associated with more than one TSPEC object. With reference to FIG. 2, a router or, more generally, a device which is capable of processing an overall request that includes multiple bandwidth requests in accordance with an embodiment of the present invention. A routing device or intermediate node 212 is generally arranged to process an incoming message, as for example a request message 232, and propagate an outgoing message, as for example a request message 232'. In general, node 212 includes hardware and/or software logic that is embodied on a tangible medium. The logic is typically executable and, when executed, is operable to process an incoming message and to propagate an outgoing message. The incoming message is not limited to being a request message such as request message 232. By way of example, node 212 may process incoming messages which are error messages such as error messages.

Node 212 includes an input/output arrangement 216 which may include ports that allow node 212 to receive incoming messages such as request message 232 and to send outgoing messages such as request message 232'. Input/output arrangement 216 enables node 212 to be in communication with a network. Node 212 also includes routing functionality 228 that allows node 212 to route messages to appropriate devices, e.g., next hops.

Bandwidth allocation functionality 224 allows node 212 to allocate bandwidth or, more generally, to allocate resources for calls that are routed through node 212. Bandwidth allocation functionality 224 may identify bandwidth requests specified in request message 232, and, using multiple bandwidth processing functionality 226, may process the bandwidth requests to determine the highest or most preferred bandwidth request that node 212 may support. Multiple bandwidth processing functionality 226 is configured to process request messages 232 which include a plurality of TSPEC objects 236a-c. By way of example, if node 212 has sufficient bandwidth available to reserve 100 kbps of bandwidth in response to request message 232, multiple bandwidth processing functionality 226 may store the 100 kbps corresponding to TSPEC object 236a as a reservation state in a storage arrangement 220 such that the 100 kbps is effectively identified as the bandwidth allocation corresponding to request message 232. Additionally multiple bandwidth processing functionality 226 may also store bandwidths corresponding to TSPEC objects 236b, 236c in a reservation state of storage arrangement 220. Multiple bandwidth processing functionality 226 is also configured to down-size or otherwise lower a bandwidth allocation when necessary, e.g., when notified that other nodes in a path that includes node 212 are substantially only able to accommodate a down-sized bandwidth allocation.

In one embodiment, request message 232' may be substantially the same as request message 232. That is, node 212 may be arranged to effectively forward request message 232 within a network. It should be appreciated, however, that request message 232' may instead be a modified version of request message 232.

Request message 232 includes multiple TSPEC objects 236a-c that are each arranged to specify a desired bandwidth. As shown, for purposes of illustration, TSPEC object 236a specifies a bandwidth of approximately 100 kilobytes per second (kbps), TSPEC object 236b specifies a bandwidth of approximately 80 kbps, and TSPEC object 236c specifies a bandwidth of approximately 8 kbps. It should be appreciated that the number of TSPEC objects 236a-c, as well as the bandwidths associated with TSPEC objects 236a-c, may vary widely. Within request 232, TSPEC objects 236a-c may be ordered such that TSPEC object 236a, which corresponds to a highest desired bandwidth, is a preferred or preferential bandwidth whereas TSPEC object 236c, which corresponds to a lowest desired bandwidth, is a least preferred bandwidth.

When node 212 processes request 232 using bandwidth allocation functionality 224, node 212 determines which bandwidth specified in request message 232 may be accommodated, e.g., stored as reservations states in storage 220 and forwarded in request 232'. Request 232' effectively includes a TSPEC object which specifies a highest possible bandwidth 240 which node 212 may support or accommodate. Request 232' optionally includes a TSPEC object or objects which specify lower possible bandwidths 240 which node 212 may support or accommodate, i.e., lower possible bandwidths 240 may be specified when they exist. Depending upon the bandwidth availability associated with node 212, any of TSPEC objects 236a-c may be associated with highest possible bandwidth 240. For example, if bandwidth allocation functionality 224 processes request 232 and determines that the preferential bandwidth associated with TSPEC object 236a may not be supported, then highest possible bandwidth 240 may be the bandwidth associated with TSPEC object 236b, namely approximately 80 kbps. As such, lower bandwidth 244 is the bandwidth associated with TSPEC object 236b, namely 8 kbps.

Figure 3:
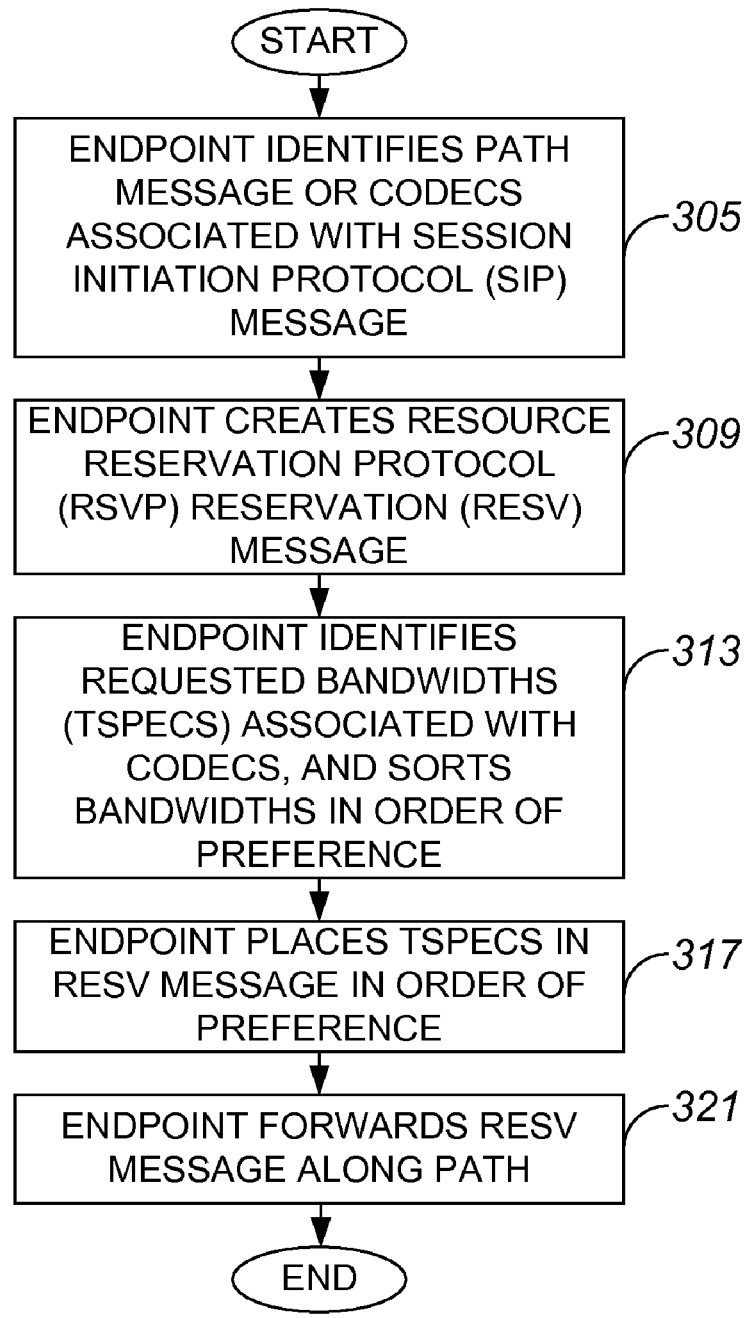
FIG. 3 is a process flow diagram which illustrates a method of specifying multiple acceptable bandwidths in a RESV request arranged to reserve a bandwidth in accordance with an embodiment of the present invention.

FIG. 3 is a process flow diagram which illustrates a method of specifying multiple acceptable bandwidths in a RESV message arranged to reserve a bandwidth in accordance with an embodiment of the present invention. A process 301 of specifying multiple acceptable bandwidths in a RESV message begins at step 305 in which an endpoint, e.g., a downstream endpoint such as endpoint 108 of FIG. 1A, identifies a PATH message or codecs associated with a received session initiation protocol (SIP) message. The identified PATH message, which is an RSVP message as will be appreciated by those skilled in the art, may be received from an upstream endpoint such as endpoint 104 of FIG. 1A.

In step 309, the endpoint creates a RESV message. Then, in step 313, the endpoint identifies requested bandwidths, e.g., TSPEC objects, associated with codes, and sorts the bandwidths in order of preference. That is, the endpoint may order TSPEC objects in an order that enables the TSPEC object corresponding to a preferential bandwidth to be identified as being preferred. Typically, the order of preference may be such that the TSPEC object associated with a highest desired bandwidth has the highest preference whereas the TSPEC object associated with a lowest acceptable bandwidth has the lowest preference.

Once the bandwidths are sorted in order of preference, the endpoint places the TSPEC objects in the RESV message in step 317. Typically, the TSPEC objects are specified in the RESV message in the order of preference. After the TSPEC objects are placed in the RESV message, the endpoint forwards the RESV message along a path in step 321. That is, the endpoint sends the RESV message to the sender of the PATH message on the path that was traversed by the PATH message. Forwarding the RESV message along the path includes providing the RESV message to the next hop in the path. The process of specifying multiple acceptable bandwidths in a RESV message.

Figure 4A:
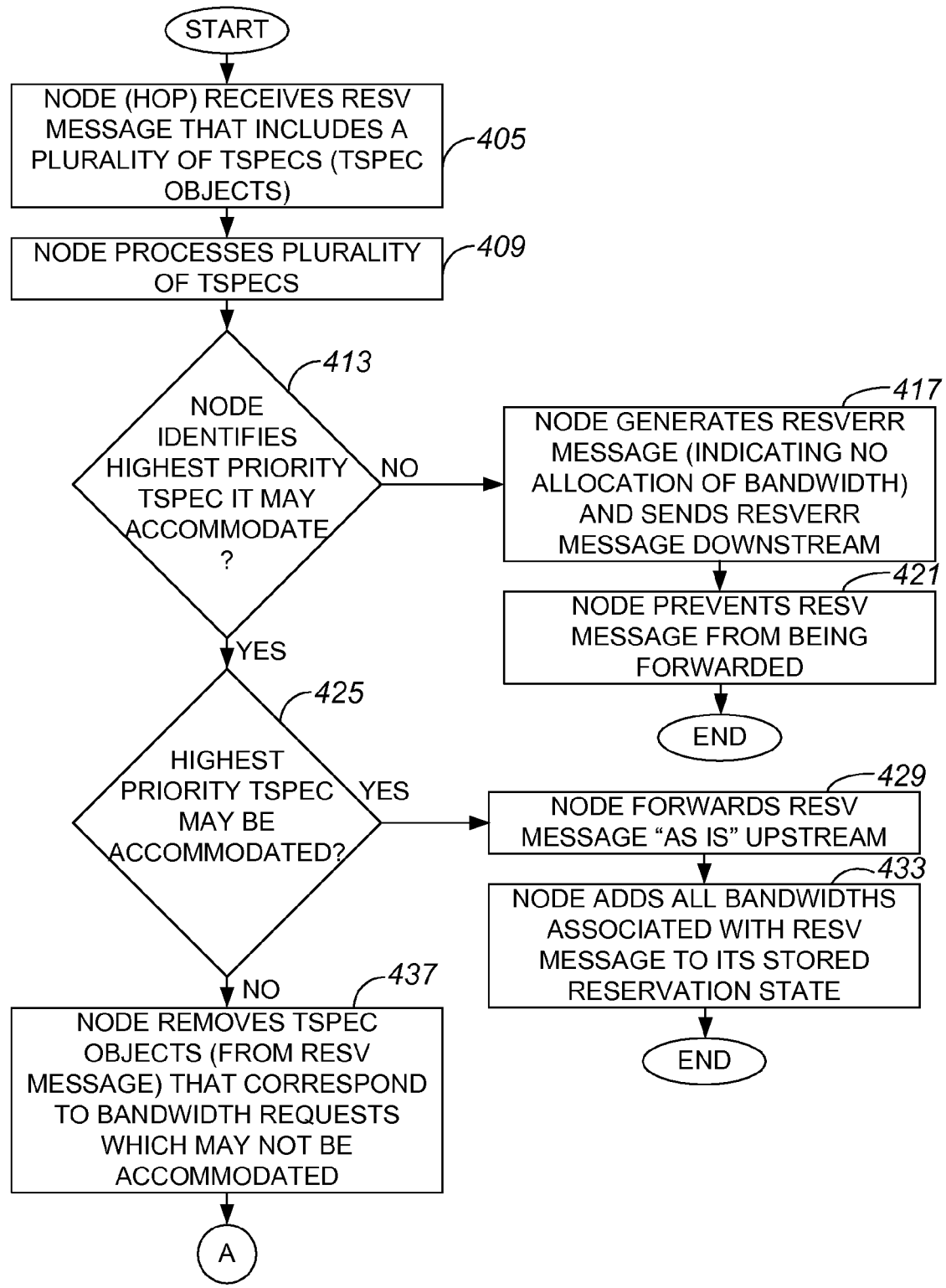
FIGS. 4A and 4B are a process flow diagram which illustrates a method of reserving a bandwidth selected from multiple acceptable bandwidths specified in an RESV message received at a node or a hop along a path in accordance with an embodiment of the present invention.
Figure 4B:
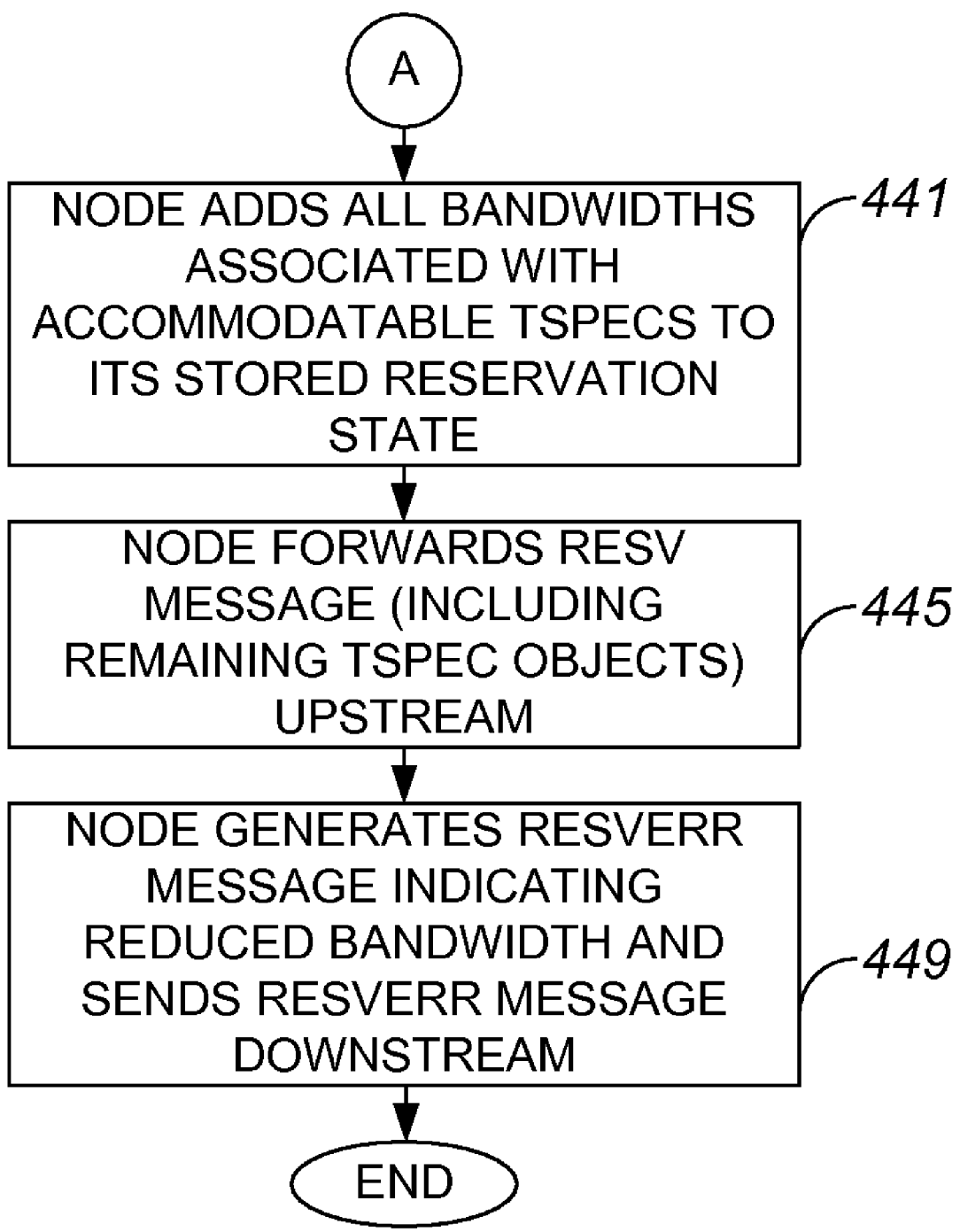

When a hop receives an RESV message that includes a plurality of TSPEC objects and, hence, includes a plurality of bandwidths, the hop generally processes the RESV message to identify the highest bandwidth that the hop is capable of supporting. FIGS. 4A and 4B are a process flow diagram which illustrates a method of reserving a bandwidth selected from multiple acceptable bandwidths specified in an RESV message received at a node or a hop along a path in accordance with an embodiment of the present invention. A process 401 of reserving a bandwidth on a node begins at step 405 in which a node receives an RESV message that includes a plurality of TSPEC objects or, more generally, a plurality of bandwidths. The RESV message may be received directly from an endpoint, or may be received indirectly from an endpoint via another hop in a path that includes the endpoint and the node. The node is typically a hop in the path that the RESV message is traversing.

After the RESV message is received by the node, the node processes the plurality of TSPEC objects contained in the RESV message in step 409. That is, the node processes the plurality of bandwidths associated with the RESV message. The TSPEC objects or bandwidths are typically processed to identify the highest bandwidth that the node may accommodate.

A determination is made in step 413 as to whether the node has identified the highest priority TSPEC object or bandwidth that it is able to accommodate. If it is determined that the node has not identified a highest priority TSPEC object that it is able to accommodate, the indication is that the node is unable to support any of the bandwidths specified in the RESV message. As such, process flow moves to step 417 in which the node generates a RESVERR message which indicates that the node is unable to allocate any bandwidth in response to the RESV message, and sends the RESVERR message downstream. Then, in step 421, the node prevents the RESV message from being forwarded, and the process of reserving a bandwidth on a node is completed.

Returning to step 413, if the determination is that the node has identified a highest priority TSPEC object or bandwidth that it may accommodate, then the implication is that the node may be able to accommodate the preferential bandwidth specified in the RESV message. As such, a determination is made in step 425 regarding whether the highest priority TSPEC object or bandwidth may be accommodated. In other words, it is determined whether the preferential bandwidth, i.e., the highest priority bandwidth specified in the RESV message, may be accommodated.

If it is determined in step 425 that the highest priority TSPEC object may be accommodated, then the node forwards the RESV message "as is" upstream in step 429. Then, in step 433, the node adds substantially all bandwidths associated with the RESV message into its stored reservation state, and the process of reserving a bandwidth on a node is completed. When the node adds the bandwidths into its stored reservation state, the preferential bandwidth may effectively be identified as the bandwidth that is currently accommodated, while the other bandwidths may be identified substantially as "alternatives" in the event that the currently accommodated bandwidth is subsequently no longer accommodatable.

Alternatively, if the determination is that the highest priority TSPEC object may not be accommodated, then process flow moves to step 437 in which the node removes TSPEC objects from the RESV message that correspond to bandwidth requests which may not be accommodated. That is, the node removes requested bandwidths from the RESV message that are higher than the highest priority TSPEC object that may be accommodated.

Once TSPEC objects are removed from the RESV message, the node adds substantially all bandwidths associated with accommodatable TSPEC objects to its stored reservation state. The accommodatable TSPEC objects or bandwidths include the highest priority bandwidth that may be accommodated and substantially all bandwidths with a lower priority than the highest priority bandwidth that may be accommodated.

After the node adds bandwidths to its stored reservation state, the node forwards the RESV message, from which TSPEC objects corresponding to bandwidths which the node is unable to support have been removed, upstream in step 445. Then, in step 449, the node generates a RESVERR message which indicates that the highest priority bandwidth in the RESV message, as received in step 405, may not be accommodated. The node also sends the RESVERR message downstream. It should be appreciated that the RESVERR message may identify the highest priority bandwidth that may be accommodated by the node. Upon generating and sending the RESERR message downstream, the process of reserving a bandwidth on a node is completed.

Figure 5:
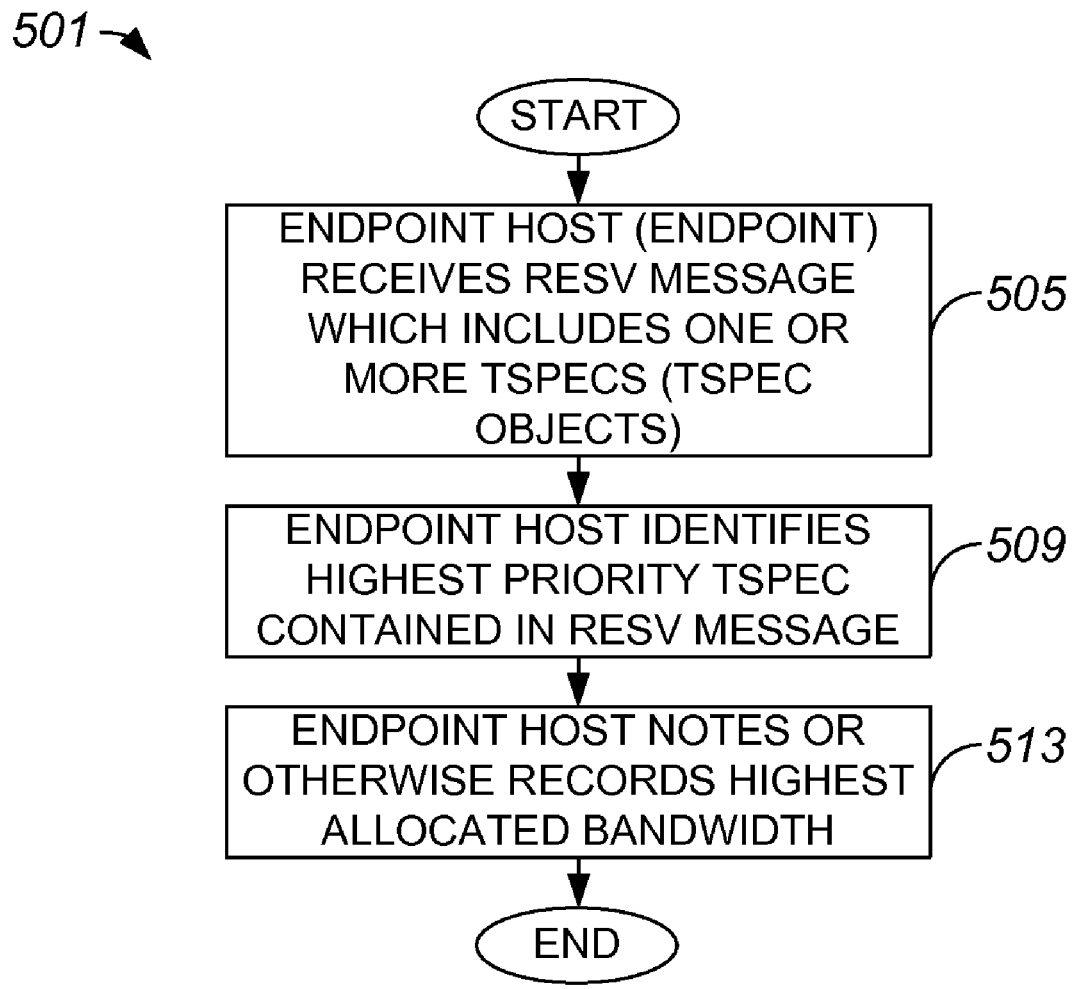
FIG. 5 is a process flow diagram which illustrates a method of processing a received RESV message at an end host, e.g., an upstream end host, in accordance with an embodiment of the present invention.

When an endpoint, e.g., an upstream endpoint, receives an RESV message, the endpoint may process the RESV message to determine the bandwidth that is supported along a path through which the RESV message was received. FIG. 5 is a process flow diagram which illustrates a method of processing a received RESV message at an endpoint host, e.g., an upstream endpoint, in accordance with an embodiment of the present invention. A method 501 of processing an RESV message received at an endpoint begins at step 505 in which an endpoint receives an RESV message which includes one or more TSPEC objects. After receiving the RESV message, the endpoint identifies the highest priority TSPEC object and, hence, highest priority bandwidth, contained in the RESV message in step 509. The highest priority bandwidth contained in the RESV message is generally indicative of the bandwidth that is allocated or allotted along the path through which the RESV message is received.

In step 513, the endpoint notes or otherwise records the highest allocated bandwidth. By noting the highest allocated bandwidth, the endpoint may send messages on the path that do not exceed the highest allocated bandwidth. Once the highest allocated bandwidth is noted or otherwise recorded, the method of processing an RESV message received at an endpoint is completed.

Figure 6:
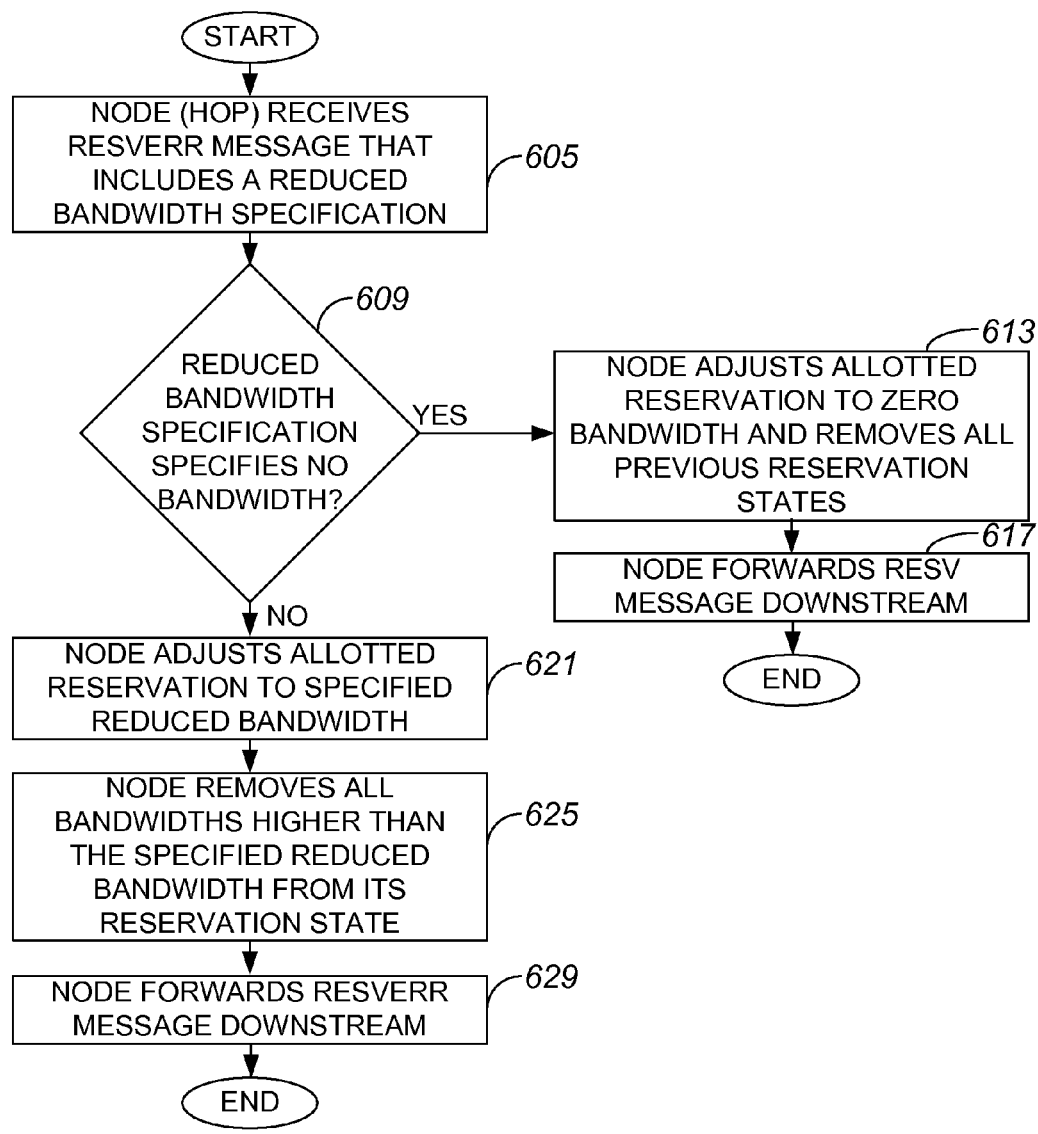
FIG. 6 is a process flow diagram which illustrates a method of downgrading a bandwidth allocation at a node along a path in accordance with an embodiment of the present invention.

When a node along a path receives a RESVERR message, that node is generally downsizes or downgrades its current bandwidth allocation to a bandwidth consistent with the bandwidth specified in the RESVERR message. It should be appreciated that a RESVERR message is just one example of a message that may effectively provide a reduced bandwidth specification. FIG. 6 is a process flow diagram which illustrates a method of downgrading a bandwidth allocation at a node along a path in response to receiving a reduced bandwidth specification in accordance with an embodiment of the present invention. A process 601 of downgrading a bandwidth allocation begins at step 605 in which a node, e.g., a hop along a path, receives a RESVERR message that includes a reduced bandwidth specification. The node has previously stored a reservation state which includes at least one bandwidth allocation, i.e., the node has previously stored at least a currently allotted bandwidth. In addition to the currently allotted bandwidth, or allotted reservation, the node may also have stored additional reservation states, or bandwidths to which the currently allotted bandwidth may be downsized to.

A determination is made in step 609 as to whether the reduced bandwidth specification specifies no bandwidth. In other words, it is determined if the RESVERR message indicates that there is no available bandwidth upstream from the node. If it is determined that the reduced bandwidth specification specifies no bandwidth, the node adjusts the allotted bandwidth in step 613 to indicate that substantially no bandwidth may be supported. The node also substantially removes the allotted reservation and any previous reservations states. Once the node adjusts the allotted reservation, the node forwards the RESVERR message downstream in step 617, and the process of downgrading a bandwidth allocation is completed.

Returning to step 609, if the determination is that the reduced bandwidth specification specifies a bandwidth, then process flow moves to step 621 in which the node adjusts the allotted reservation, or the current bandwidth allocation, the specified reduced bandwidth. Then, in step 625, the node removes substantially all bandwidths that are higher than the specified reduced bandwidth from its reservation state. Removing substantially all bandwidths that are higher than the specified reduced bandwidth effective downgrades the bandwidth allocation to the specified reduced bandwidths. After the node removes substantially all bandwidths that are higher than the specified reduced bandwidth from its reservation state, the node forwards the RESVERR message downstream in step 629, and the process of downgrading a bandwidth allocation is completed.

Figure 7:
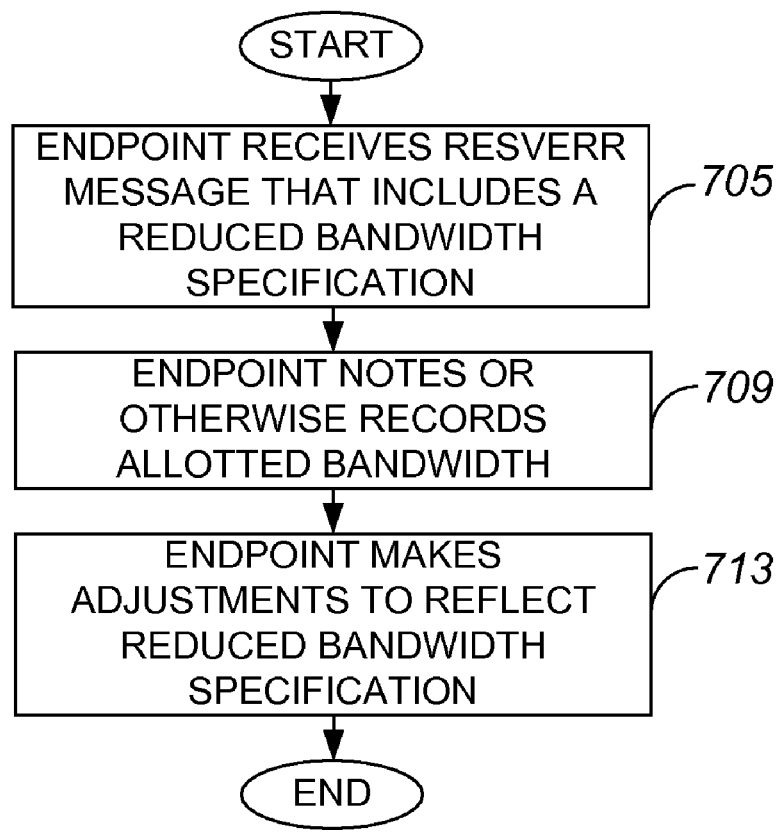
FIG. 7 is a process flow diagram which illustrates a method of downgrading a bandwidth allocation at an end host, e.g., a downstream end host, in response to a received RESVERR message in accordance with an embodiment of the present invention.

Eventually, a RESVERR message sent in response to an RESV message initiated by an endpoint or end host will receive the RESVERR message. Referring next to FIG. 7, a process of downgrading a bandwidth allocation at an endpoint, e.g., a downstream endpoint, in response to a received RESVERR message will be described in accordance with an embodiment of the present invention. A process 701 of downgrading a bandwidth allocation at an endpoint begins at step 705 in which an endpoint receives a RESVERR message that includes a reduced bandwidth specification. The reduced bandwidth specification effectively specifies the bandwidth which has been allotted along the path on which the RESV message was forwarded. Upon receiving the RESVERR message, the endpoint typically notes or otherwise records the allotted bandwidth in step 709.

In step 713, the endpoint makes adjustments to reflect the reduced bandwidth specification. Such adjustments may include effectively ensuring that messages forwarded by the endpoint along the path will utilize at most the reduced bandwidth. The process of downgrading a bandwidth allocation at an endpoint is completed once the endpoint makes adjustments to maintain consistency with the reduced bandwidth specification.

The inclusion of multiple bandwidth requests within the same reservation request in a single RSVP message, e.g., a single RESV request message, allows applications to efficiently reserve substantially the exact bandwidth that may be used in a call. With multiple bandwidth request specified in a single message, a post-dial delay budget is generally not overrun. As a result, an application may efficiently select and/or change the codec of a call based on the reservation information up to the maximum that may be supported, as indicated by the single RSVP message.

Figure 8:
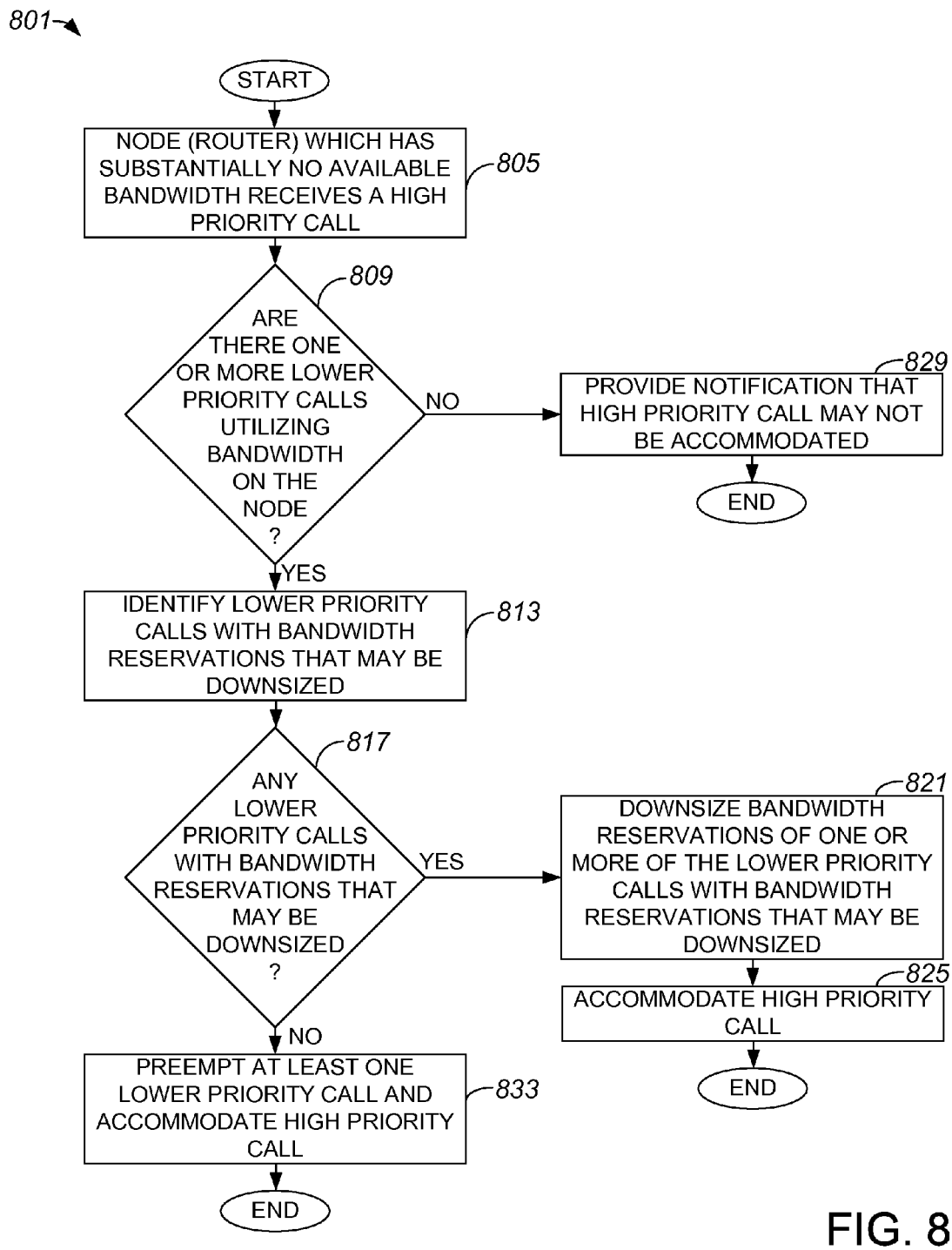
FIG. 8 is a process flow diagram which illustrates a method of responding to a high priority request when substantially all bandwidth is in use in accordance with an embodiment of the present invention.

As discussed above, a single RSVP message which includes multiple bandwidth requests within the same reservation allows multiple bandwidth request to be stored as reservation states on a node. Hence, if a relatively high priority call is received on a node which is experiencing congestion on an interface, the node may downsize or downgrade the bandwidth allocated in response to the single RSVP message such that the relatively high priority call may be accommodated substantially without discontinuing a lower priority call. FIG. 8 is a process flow diagram which illustrates a method of responding to a high priority call or request when substantially all bandwidth is in use on a node in accordance with an embodiment of the present invention. A process 801 of responding to a high priority call begins at step 805 in which a node, e.g., a router, which is congested receives a high priority call. A congested node generally has substantially no available bandwidth or insufficient bandwidth to accommodate the high priority call.

After the node receives a high priority call that it is effectively incapable of accommodating, it is determined in step 809 whether there are one or more lower priority calls which are utilizing bandwidth on the node. If it is determined that there are no lower priority calls, the indication is that substantially all calls which are utilizing bandwidth on the node have a high priority. As such, in step 829, notification is provided, e.g., to the initiator of the high priority call, that the high priority call may not be accommodated. Once the notification is provided, the process of responding to a high priority call is completed.

Alternatively, if it is determined in step 809 that there are one or more lower priority calls utilizing bandwidth on the node, then process flow moves to step 813 in which lower priority calls with bandwidth reservations that may be downsized are identified. That is, lower priority calls with reservation states that specify preferred bandwidths and lower bandwidths are identified.

A determination is made in step 817 as to whether there are any lower priority calls with bandwidth reservations that may be downsized. If the determination is that there are lower priority calls with bandwidth reservations that may be downsized, then the bandwidth reservations of one or more lower priority calls are downsized in step 821. In one embodiment, if downsizing one lower priority call is sufficient to accommodate the high priority call, then substantially only one lower priority call will be downsized. It should be appreciated, however, that the policies and algorithms used to determine how to downsize reservations may vary widely. By way of example, in lieu of specifying that substantially only a certain number of lower priority calls may have their bandwidth reservations downsized, a policy may specify that the bandwidth reservations of the oldest lower priority calls are downsized, or a policy may specify that the bandwidth reservations of substantially all lower priority calls are downsized.

After the bandwidth reservations of one or more of the lower priority calls are downsized in step 821, the high priority call may be accommodated, e.g., put through or otherwise connected, in step 825. The process of responding to a high priority call is completed once the high priority call is accommodated.

Returning to step 817, if the determination is that none of the lower priority calls have bandwidth reservations that may be downsized, then at least one lower priority call is preempted or discontinued in step 833 such that the high priority call may be accommodated. After at least one lower priority call is preempted, the process of responding to a high priority call is completed.

Although only a few embodiments of the present invention have been described, it should be understood that the present invention may be embodied in many other specific forms without departing from the spirit or the scope of the present invention. By way of example, an application such as the Cisco Unified Communications Manager (available commercially from Cisco Systems, Inc. of San Jose, Calif.) may effectively ask an RSVP agent to book a highest preferred bandwidth as well as other bandwidths that may be used in the even that the highest preferred bandwidth is not available. The highest preferred bandwidth request may be accommodated, e.g., if endpoints are in substantially the same location, or a reduced bandwidth may be accepted by the application if the highest preferred bandwidth request may not be accommodated. Depending upon the bandwidth allotted, the application may identify an appropriate codec to invoke.

While multiple bandwidths have been described as being specified in a RESV message through the use of TSPECs or TSPEC objects, the bandwidths are not limited to being specified using TSPECs or TSPEC objects. For instance, multiple bandwidths may be specified in service-request specification (RSPEC) objects associated RESV messages.

In one embodiment, if none of the bandwidths specified in a RESV message may be supported, no bandwidth may be allocated in response to the RESV message. It should be appreciated, however, that some bandwidth may instead be allocated even if none of the specified bandwidths may be supported. For example, if a RESV message specifies a lowest preferred bandwidth, if the lowest preferred bandwidth may not be accommodated, rather than allocating substantially no bandwidth in response to the RESV message, an amount of bandwidth that is less than the lowest preferred bandwidth may be allocated.

The steps associated with the methods of the present invention may vary widely. Steps may be added, removed, altered, combined, and reordered without departing from the spirit of the scope of the present invention. By way of example, when a high priority request is received on a congested router that has no available bandwidth and no reservations for lower priority calls, in lieu of not accommodating the high priority request, the router may instead downsize the bandwidths of calls with substantially the same bandwidth as the request such that the request may be accommodated. Therefore, the present examples are to be considered as illustrative and not restrictive, and the invention is not to be limited to the details given herein, but may be modified within the scope of the appended claims.

What is claimed is:

1. A method comprising:
obtaining a first message, the first message including a plurality of bandwidth requests, wherein the plurality of bandwidth requests includes at least a first bandwidth request that specifies a first bandwidth and a second bandwidth request that specifies a second bandwidth, the first bandwidth being a preferential bandwidth;
determining whether the first bandwidth may be allocated;
storing the first bandwidth and the second bandwidth in a stored reservation state if it is determined that the first bandwidth may be allocated;
determining whether the second bandwidth may be allocated if it is determined that the first bandwidth may not be allocated; and
storing the second bandwidth in the stored reservation state if it is determined that the second bandwidth may be allocated.

2. The method of claim 1 wherein the first message is a resource reservation protocol (RSVP) message associated with a reservation request.

3. The method of claim 2 wherein the first message is an RSVP reservation (RESV) request message.

4. The method of claim 3 wherein the first bandwidth request is included in a first traffic specification (TSPEC) object and the second bandwidth request is included in a second TSPEC object.

5. The method of claim 1 further including:
removing the first bandwidth request from the first message if it is determined that the first bandwidth may not be allocated; and
forwarding the first message after removing the first bandwidth request.

6. The method of claim 1 wherein if it is determined that the first bandwidth may be allocated, the method further including:
obtaining a second message, the second message being arranged to indicate that the first bandwidth may no longer be allocated; and
removing the first bandwidth from the stored reservation state.

7. The method of claim 1 wherein if it is determined that the second bandwidth may not be allocated, the method further includes:
generating an error message, the error message being arranged to indicate that none of the plurality of bandwidth request may be accommodated.

8. An apparatus comprising:
means for obtaining a first message, the first message including a plurality of bandwidth requests, wherein the plurality of bandwidth requests includes at least a first bandwidth request that specifies a first bandwidth and a second bandwidth request that specifies a second bandwidth, the first bandwidth being a preferential bandwidth;
means for determining whether the first bandwidth may be allocated;
means for storing the first bandwidth and the second bandwidth in a stored reservation state if it is determined that the first bandwidth may be allocated;
means for determining whether the second bandwidth may be allocated if it is determined that the first bandwidth may not be allocated; and
means for storing the second bandwidth in the stored reservation state if it is determined that the second bandwidth may be allocated.

9. The apparatus of claim 8 wherein the first message is a resource reservation protocol (RSVP) message associated with a reservation request.

10. The apparatus of claim 9 wherein the first message is an RSVP reservation (RESV) request message.

11. The apparatus of claim 10 wherein the first bandwidth request is included in a first traffic specification (TSPEC) object and the second bandwidth request is included in a second TSPEC object.

12. Logic encoded embodied as computer-readable program code in one or more tangible non-transitory computer-readable media for execution, and when executed operable to:
obtain a first message, the first message including a plurality of bandwidth requests, wherein the plurality of bandwidth requests includes at least a first bandwidth request that specifies a first bandwidth and a second bandwidth request that specifies a second bandwidth, the first bandwidth being a preferential bandwidth;
determine whether the first bandwidth may be allocated;
store the first bandwidth and the second bandwidth in a stored reservation state if it is determined that the first bandwidth may be allocated;

determine whether the second bandwidth may be allocated if it is determined that the first bandwidth may not be allocated; and store the second bandwidth in the stored reservation state if it is determined that the second bandwidth may be allocated.

13. The logic of claim 12 wherein the first message is a resource reservation protocol (RSVP) message associated with a reservation request.

14. The logic of claim 13 wherein the first message is an RSVP reservation (RESV) request message.

15. The logic of claim 14 wherein the first bandwidth request is included in a first traffic specification (TSPEC) object and the second bandwidth request is included in a second TSPEC object.

16. The logic of claim 12 further operable to:

remove the first bandwidth request from the first message if it is determined that the first bandwidth may not be allocated; and forward the first message after removing the first bandwidth request.

17. The logic of claim 12 wherein if it is determined that the first bandwidth may be allocated, the logic is further operable to:

obtain a second message, the second message being arranged to indicate that the first bandwidth may no longer be allocated; and remove the first bandwidth from the stored reservation state.

18. The logic of claim 12 wherein if it is determined that the second bandwidth may not be allocated, the logic is further operable to:

generate an error message, the error message being arranged to indicate that none of the plurality of bandwidth request may be accommodated.

19. An apparatus comprising:

an input/output arrangement, the input/output arrangement being arranged to obtain a first message that includes a plurality of bandwidth requests, the plurality of bandwidth requests including at least a first bandwidth request that specifies a first bandwidth and a second bandwidth request that specifies a second bandwidth, the first bandwidth being a preferential bandwidth;

a storage arrangement; and a bandwidth processing arrangement, the bandwidth processing arrangement being configured to determine whether the first bandwidth may be allocated, the bandwidth processing arrangement further being configured to store the first bandwidth and the second bandwidth into the storage arrangement as a stored reservation state if it is determined that the first bandwidth may be allocated.

20. The apparatus of claim 19 wherein the bandwidth processing arrangement is further arranged to determine whether the second bandwidth may be allocated if it is determined that the first bandwidth may not be allocated, and to store the second bandwidth into the storage arrangement as the stored reservation state if it is determined that the second bandwidth may be allocated.

21. The apparatus of claim 20 wherein the bandwidth processing arrangement is still further arranged to remove the first bandwidth request from the first message if it is determined that the first bandwidth may not be allocated, and wherein the input/output arrangement is configured to forward the first message after the first bandwidth request is removed.

22. The apparatus of claim 20 wherein the apparatus is a routing device, and wherein the apparatus further includes a routing arrangement.

23. The apparatus of claim 19 wherein the input/output arrangement is configured to obtain a second message if it is determined that the first bandwidth may be allocated, the second message being arranged to indicate that the first bandwidth may no longer be allocated, and wherein the bandwidth processing arrangement is further arranged to remove the first bandwidth from the stored reservation state.

24. The apparatus of claim 19 wherein the first message is a resource reservation protocol (RSVP) message associated with a reservation request.

25. The apparatus of claim 24 wherein the first message is an RSVP reservation (RESV) request message.

26. The apparatus of claim 25 wherein the first bandwidth request is included in a first traffic specification (TSPEC) object and the second bandwidth request is included in a second TSPEC object.

* * * * *